US006971020B1

(12) United States Patent
Liardet et al.

(10) Patent No.: US 6,971,020 B1

(45) Date of Patent: Nov. 29, 2005

(54) CIRCUIT AND METHOD FOR THE SECURING OF A COPROCESSOR DEDICATED TO CRYPTOGRAPHY

(75) Inventors: Pierre-Yvan Liardet, Peynier (FR); Fabrice Romain, Aix-en-Provence (FR); Bernard Plessier, Meyreuil (FR); Brigitte Hennebois, Aix-en-Provence (FR)

(73) Assignee: STMicroelectronics SA, Gentilly (FR)

( * ) Notice: Subject to any disclaimer, the term of this patent is extended or adjusted under 35 U.S.C. 154(b) by 0 days.

(21) Appl. No.: 09/506,158

(22) Filed: Feb. 17, 2000

(30) Foreign Application Priority Data

Feb. 25, 1999 (FR) .................................. 99 02365

(51) Int. Cl.[7] ............................................... G06F 17/00

(52) U.S. Cl. ........................ 713/190; 380/28; 380/255; 713/189

(58) Field of Search ........ 713/189–194; 380/255–265, 380/28–30

(56) References Cited

U.S. PATENT DOCUMENTS 6,144,744 A * 11/2000 Smith et al. .................. 380/45

OTHER PUBLICATIONS

“80×86 Evolution”, Sep. 2, 1998, [Retreived from Internet Jul. 8, 2004], http://www.ee.vt.edu/~ee4536an/notes/lect_01s.pdf.*

* cited by examiner

*Primary Examiner*—David Jung

(74) *Attorney, Agent, or Firm*—Lisa K. Jorgenson; Allen, Dyer, Doppelt, Milbrath & Gilchrist, P.A.

(57) ABSTRACT

A circuit and a method are provided for securing a coprocessor dedicated to cryptography. The disclosed circuit includes a scrambling register and an accessory input register to convey scrambling information in the form of electrical signals that disturb the visibility of certain electrical signals associated with confidential information such as digital keys.

22 Claims, 2 Drawing Sheets

CIRCUIT AND METHOD FOR THE SECURING OF A COPROCESSOR DEDICATED TO CRYPTOGRAPHY

FIELD OF THE INVENTION

The present invention relates to cryptography, and, more particularly, the invention relates to a circuit and a method for securing the loading of a digital key and/or message to be encrypted or decrypted.

BACKGROUND OF THE INVENTION

The field of the invention is cryptology. Cryptology can be defined as the science of concealing information. It is, along with the physical security of the components and of exploiting systems, a critical characteristic of chip card security.

Cryptology encompasses both cryptography, which is the art of encrypting and decrypting messages, and cryptanalysis which is the art of breaking secret codes. The encryption of messages includes the conversion of information by a secret convention. The conversion function constitutes the cryptographic algorithm whose secret lies in parameters known as keys. The reverse operation, which is the decrypting of the message, requires a knowledge of these keys.

In chip cards, cryptography implements various mechanisms aimed at ensuring either the confidentiality of the information or the authentication of the cards or users or again the signature of the messages. All the means implementing cryptography form a cryptography system.

FIG. 1 is a simplified diagram of a typical cryptography system. In this figure, a non-encrypted message is transmitted from a transmission unit 1 to a reception unit 2 in the form of an encrypted message. In the transmission unit 1, the non-encrypted message is converted by an algorithm A which is a function of an encryption key C1. In the reception unit 2, the information received is decrypted by a reverse algorithm $A^{-1}$ which uses a decryption key C2 in order to recover the non-encrypted message. In this specific case, i.e. when an encryption and decryption algorithm is used, the encryption key and the decryption key are identical. A message can thus be transmitted between a sending unit and a reception unit on an unsecured channel. Only an authorized user holding the secret decryption key can decode the encrypted message.

The decryption operation implies that the encryption algorithm is a reversible algorithm. This condition is not necessary for example during an authentication operation. Indeed, certain authentication mechanisms use one and the same algorithm at both the sending and the reception of a message. The choice of an encryption algorithm for a chip card depends on the type of security service expected, the performance and above all the cost of the resources needed to install this algorithm. This cost depends on the size of the RAM and ROM type memories.

Indeed, the use of bulky algorithms very quickly increases the price of chip cards. An encryption algorithm widely used in chip cards is the DES (Data Encryption System) algorithm according to the ISO/ANSI standard. An algorithm of this kind requires two data inputs (the encryption or decryption key and the information to be encrypted or decrypted) and produces a piece of output data (the result of the processing by the algorithm). The size of the signals coming from the encryption algorithm is generally 64 bits. The non-encrypted message may be converted into an encrypted message of the same length or of a different length, for example by combining data blocks, stringing them and thus enabling identical data blocks to be encrypted differently.

There are symmetrical cryptography systems: these are cryptography systems making use of encryption and decryption algorithms whose encryption and decryption keys are identical. When the encryption and decryption keys are different, the cryptography system is called asymmetrical. Other cryptography systems exist, especially cryptography systems with zero knowledge input.

Symmetrical algorithms raise problems of key management. Indeed, when a large number of users forms part of a network, each of them should have a personalized key since one key for all would endanger the whole system if it ever got compromised. Since it is impractical and risky to store all the keys, the method lies in diversifying them by a master key and an identifier for each card. The master keys need to be particularly well protected and may be contained in a security module or a card known as a mother card possessed by the sender of the cards.

FIG. 2 illustrates an exemplary dynamic verification of the validity of an operation for decrypting a digital message transmitted in encrypted form. In this figure, a random number NA is encrypted by an encryption algorithm A that brings an encryption key C1 into operation. An encrypted message MC thus created is transmitted to a chip card 20. A microcomputer 21 of the chip card 20 decrypts the encrypted message by a reverse decryption algorithm $A^{-1}$ and a decryption key C2 which, in practice, is identical to the encryption key C1. A number R is the result of this decryption operation. A test module 22 makes it possible to retrieve the number R and compare it with the initially sent number NA. The chip card 20, which has performed the operation of decrypting the encrypted message MC, is considered to be authentic if the number NA is equal to the number R. Only an authentic card is capable of retrieving the number NA by using its secret key.

The digital keys used by the electronic components to encrypt or decrypt messages, especially in chip card microcomputers, are therefore essential for the confidentiality of the data elements conveyed. Anybody possessing the digital key associated with an encryption algorithm or decryption algorithm can access data not intended for him or her.

The conventional system that uses these digital keys still has a few weaknesses in terms of achieving security, for example during the loading of a digital key used for the encryption or decryption of a digital message. An example of such a situation is given in FIG. 3. FIG. 3 shows an electronic circuit 3 loading an encryption or decryption digital key into the registers of a coprocessor dedicated to cryptography.

In FIG. 3, a memory module 30 is connected to a battery of input/output registers 32 by a two-way link 31. The battery of input/output registers 32 include elementary registers which, for example, have a memory capacity of one eight-bit byte (hereinafter, in the present document, the term "byte" shall be defined as an eight-bit byte). A multiplexer 34 distributes the data contained in the battery of input/output registers 32 between elementary registers of an input register 36 and a key register 38. A control module 40 manages all the operations performed by the memory module 30, the battery of input/output registers 32 and the multiplexer 34. The control module 40 furthermore ensures that the data elements to be encrypted or decrypted sent by the memory module 30 are transmitted into the input register 36 by a first communication bus B1 and that the data relative to the digital key is transmitted into the key register 38 by a second communications bus B2.

There are several possible types of operation for the transmission of data from the battery of input/output registers 32 to the input register 36 and the key register 38. A first mode of transmission may be the following: all the elementary registers of the battery of input/output registers 32 are filled with data elements coming from the memory module 30. Only then is the totality of the information contained in the battery of input/output registers 32 transmitted into each of the appropriate elementary registers of the input register 36 or, as the case may be, into each of the appropriate elementary registers of the key register 38.

Another possible mode of transmission is the following one: whenever a register of the battery of input/output registers is loaded from the memory module 30, it is immediately transmitted through the multiplexer 34 to an appropriate elementary register of the input register 36 or the key register 38. In any case, a processing module 42 working by an encryption or decryption algorithm requires all the data, pertaining to the message to be processed, that is contained in the input register 36 and all the data, pertaining to the digital key, that is contained in the key register 38. The working of the processing module is also managed by the control unit 40.

The message to be processed and the digital key are transmitted to the processing module 42 respectively from the input register 36 and from the key register 38, respectively by a link 41 and a link 43. With all these data elements, the processing module 42 is capable of transmitting a message processed into an output register 44 by means of a link 45. The data elements contained in the output register 44 can then be transmitted to the memory module 30 through the multiplexer 34, the battery of input/output registers 32 and a third communications bus B3 which exchanges data between the output register 44 and the multiplexer 34.

A circuit of the kind described in FIG. 3 poses a problem of external visibility. Indeed, a measurement of the electrical signals revealing information exchanges between different parts of the circuit could enable access to confidential information that plays a role in the protection of data by the encryption or decryption system.

Indeed, when the digital key is being used by a certified component (such as a chip card), the digital key could become visible to a certain degree through the study of such electrical signals. The sensitive electrical signals may be observed on electrical links or communication buses, especially between the memory module 30 and the battery of input/output registers 32, as well as between the battery of input/output registers 32 and the multiplexer 34, between the multiplexer 34 and the different input registers 36, key registers 38 and output registers 44 or again between the different input and output registers and the processing module 42.

The digital key may thus be discovered as a result of an accumulation of measurements of the electrical signals referred to here above and a statistical study of these measurements. The component may for example use the digital key in the situation shown in FIG. 3. For example, in the case where the component performs an encryption operation, to perform an operation of this kind, the component needs to load the encryption key from an internal memory module. It may thus be authenticated as being a legitimate component entitled to perform the operation. Thus, if the component is observed when it is known to be performing an operation to load the key, then it is possible, by recording the information conveyed by the electrical signals brought into play, to arrive at knowledge on the digital encryption key. Once this key is known, it is very easy to reproduce the behavior of the legitimate component and subsequently perform operations initially prohibited to some user or another.

Another exemplary case may pose a problem on the visibility of the information flowing in the form of electrical signals. Indeed, apart from information on the digital key, it is also possible, by the study of certain electrical signals, especially between the output of the processing module and the memory module, to know the processed result recovered by the component in its memory module. The knowledge of only the encryption or decryption result, possibly in association with the knowledge of the original message to be encrypted or decrypted, may be enough to thwart the security provided by the confidentiality of a digital key. Indeed, it is enough to send a component the processed result expected as a function of the initial message to enable the performance of operations that were not authorized at the outset.

SUMMARY OF THE INVENTION

It is an object of the present invention to overcome the problems that have just been described. To this end, the invention provides an electronic circuit for the securing of a coprocessor dedicated to cryptography that ensures the non-visibility, with respect to a study of electrical signals during data transfers, of the digital key or of the result of an encryption or decryption operation.

To achieve these goals, the invention includes the use of an additional register, called a scrambling register, in the battery of input/output registers 32 of the circuit described in FIG. 3. This additional register is filled by what are called scrambling bits, randomly at instants also chosen randomly during the loading of the digital key into the battery of input/output registers. A random factor is thus introduced. This random factor enables the elimination of a part of the visibility, to the outside world, of the behavior of the component and therefore of the data elements that it is processing. An analysis of the electrical signals associated with the data elements being processed can no longer be effective in obtaining possession of confidential information.

The loading of the scrambling register is a dummy operation that has no effect on the loading of the data essential to the operation of the encryption or decryption operations. The loading of very highly sensitive data is thus secured.

The invention relates to an electronic circuit for the securing of a coprocessor dedicated to cryptography comprising a memory module, a battery of input/output registers connected to the memory module by a two-way link, and a multiplexer to carry out a transfer of data between the battery of input/output registers and an input register or a key register. The input register and the key register respectively receive the data elements of a message to be processed by an encryption or decryption operation and the data elements of an encryption or decryption digital key.

The circuit also includes a processing module to perform an encryption or decryption operation accepting, at a first input, the messages to be processed contained in the input register and, at a second input, the digital key contained in the key register to process the message to be processed. Also, a control module is included to manage the operations performed by the memory module, the battery of input/output registers, the multiplexer and the processing module. Furthermore, the circuit has an output register to transmit the result of an encryption or decryption operation to the battery of input/output registers through the multiplexer. The battery of input/output registers comprises a scrambling register to receive scrambling bits foreign to the message to be encrypted or decrypted and/or to the digital key.

According to one embodiment of the invention, the circuit includes an accessory input register connected to the processing module and to the multiplexer to receive the scrambling bits sent directly by the processing module or coming from the memory module. The phrase "scrambling bits coming from the memory module" is understood to mean the scrambling bits could have been transmitted to other elements of the circuit before reaching the accessory input register.

According to one particular embodiment, the circuit according to the invention includes the scrambling bits being generated randomly by the memory module or the processing module. In the preferred applications of the invention, the scrambling bits are produced in the form of eight-bit bytes.

Another object of the invention is to provide a method for the securing of a coprocessor dedicated to cryptography comprising the steps of: transmitting data by a two-way link from a memory module to a battery of input/output registers, transmitting, through a multiplexer, from the battery of input/output registers respectively to an input register and to a key register, respectively data corresponding to a message to be processed by an encryption or decryption operation and data corresponding to an encryption or decryption digital key, and processing the message to be processed by a processing module accepting, at a first input, the data elements coming from the input register and, at a second input, the data elements coming from the key register and giving the data elements corresponding to the processed message to the output register. The method according to the invention also includes the step of the transmission, to a scrambling register of the battery of input/output registers, of the scrambling bits foreign to the message to be processed and the transmission, to the digital key, of the scrambling bits being sent directly by the memory module or coming from the processing module.

According to one embodiment of the invention, the scrambling bits are transmitted into an accessory register connected to the processing module and to the multiplexer to receive the scrambling bits sent directly by the processing module or coming from the memory module. According to a particular application of the method according to the invention, the scrambling bits are transmitted randomly. According to another particular embodiment of the method according to the invention, scrambling bits are sent to the scrambling register whenever a digital key is loaded into the battery of input/output registers.

BRIEF DESCRIPTION OF THE DRAWINGS

The different aspects and advantages of the invention shall appear more clearly from the following description, made with reference to the appended drawings, which are given purely by way of non-limiting examples of the invention, and are introduced here below.

DETAILED DESCRIPTION OF THE PREFERRED EMBODIMENTS

Figure 1:
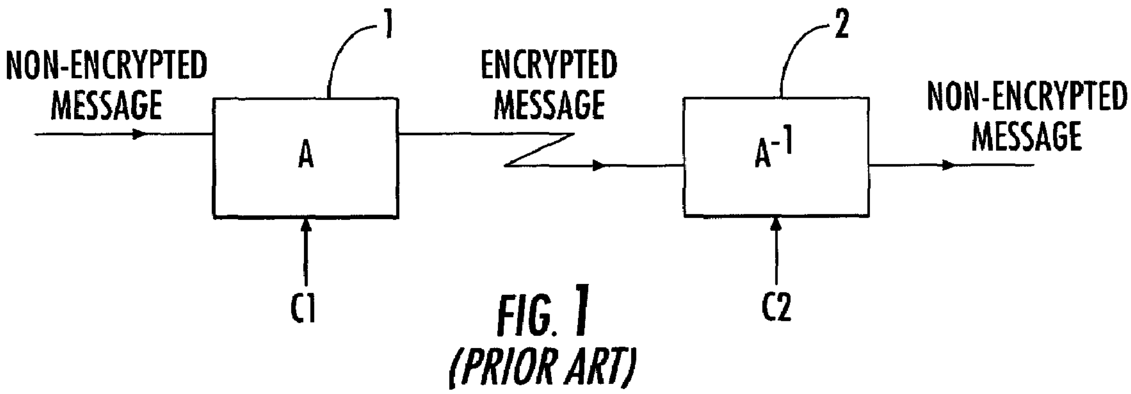
FIG. 1 is a simplified diagram of a conventional cryptography system.
Figure 2:
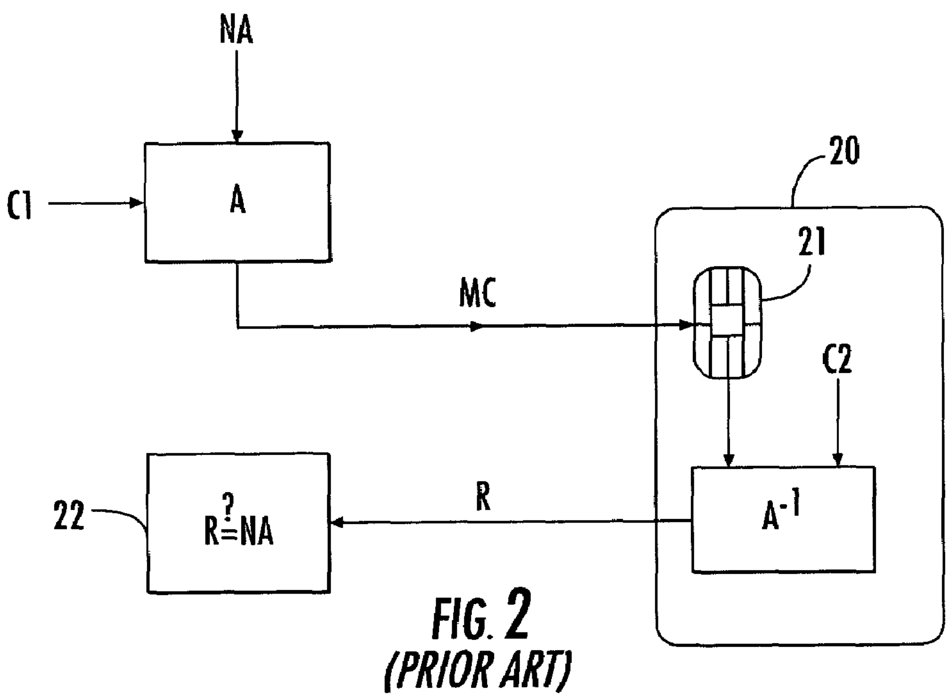
FIG. 2 illustrates a conventional example of dynamic verification of the validity of the encryption of a message transmitted after encryption.
Figure 3:
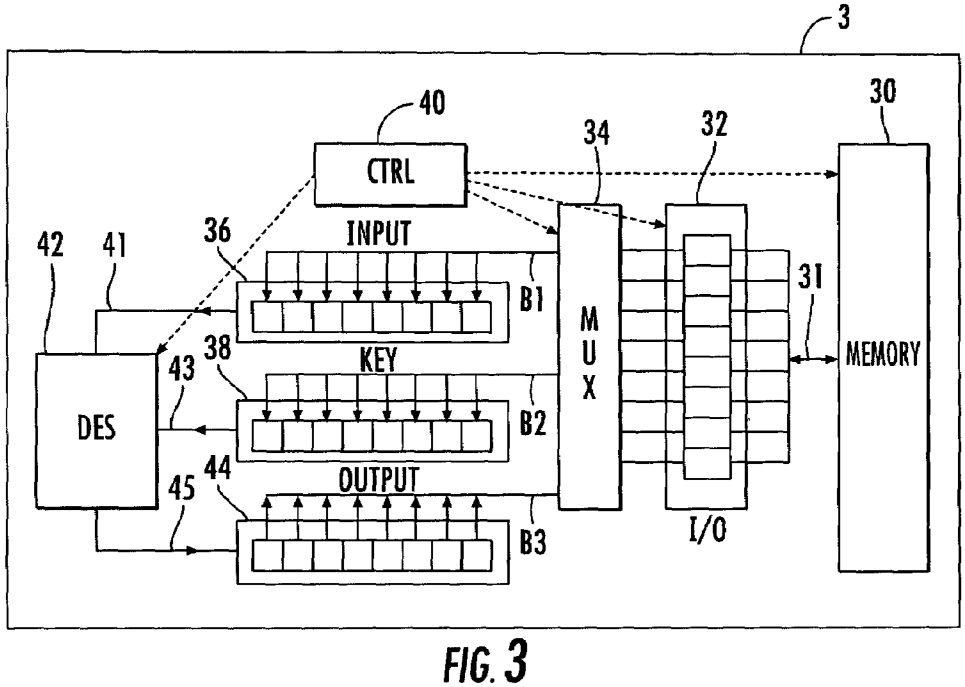
FIG. 3 illustrates a conventional electronic circuit loading a digital key into the registers of a coprocessor dedicated to the encryption of data elements.
Figure 4:
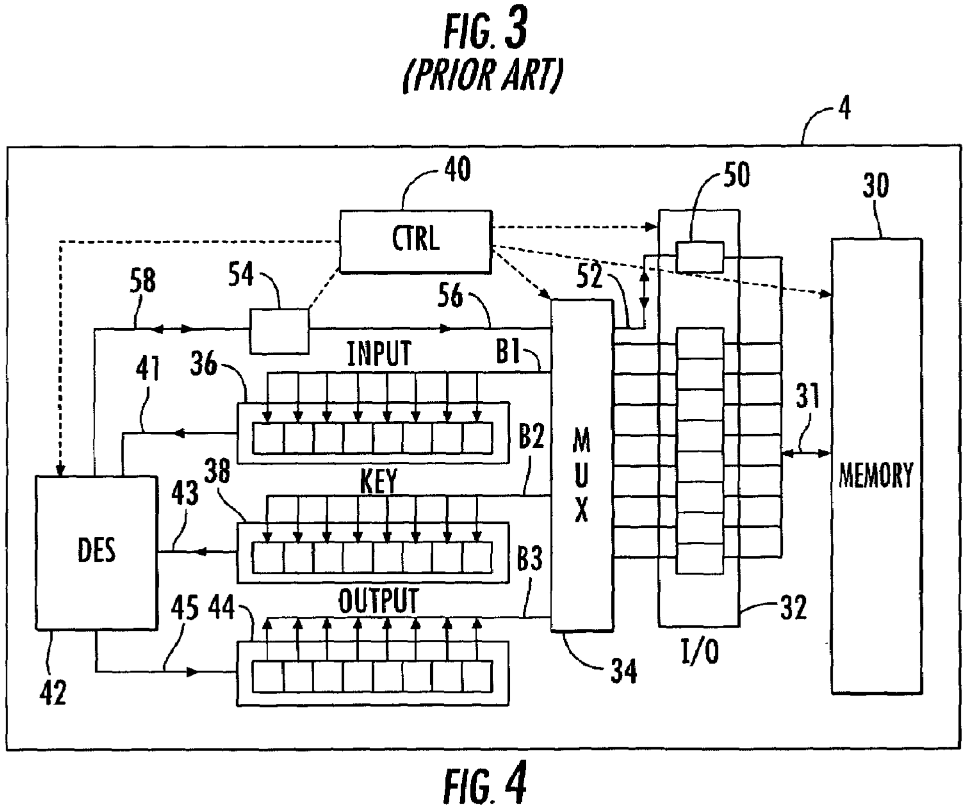
FIG. 4 illustrates an electronic circuit according to the invention obtaining the secured loading of a digital key into the registers of a coprocessor dedicated to cryptography.

FIG. 4 shows the same elements as in the electronic circuit described in FIG. 3: a memory module 30, a battery of input/output registers 32, a multiplexer 34, an input register 36, a key register 38, a control module 40, a processing module 42, and an output register 44. The figure also shows the same electrical links or communication buses as in the circuit described with reference to FIG. 3.

The circuit according to the invention can be distinguished from the prior art circuit shown in FIG. 3, by the presence of an additional register 50, called a scrambling register, in the battery of input/output registers. Unlike the other registers of the battery of input/output registers, the scrambling register 50 is not designed to receive data elements pertaining to the message to be processed or to the digital key. The scrambling register 50 is designed to receive a certain number of bits called scrambling bits that are designed to secure the loading of a digital key or a processed message into the battery of input/output registers 32.

In one particular embodiment of the invention, the scrambling register 50 may contain eight bits. Its size therefore is one byte. This example however is not restrictive and the size of the scrambling register 50 may differ according to the embodiments of the circuit according to the invention. For the sake of simplicity, the description shall hereinafter be limited to the case where the scrambling register 50 has the size of one byte. A two-way link 52 transfers data between the scrambling register 50 and the multiplexer 34.

According to a preferred embodiment of the invention, an accessory input register 54 is connected firstly to the multiplexer 34, by a two-way link 56, and secondly to the encryption module 42, by a two-way link 58. Preferably, the accessory input register 54 has the same size as the scrambling register 50. The accessory register 54 is indeed designed to receive or send scrambling bits from or to the scrambling register 50. However there is no major drawback if the accessory input register 54 has a size different from that of the scrambling register 50.

The operation of the circuit according to one particular embodiment of the invention is as follows. The memory module 30 loads a certain number of bits in the form of bytes into the elementary register of the battery of input/output registers 32. These bytes correspond either to a message to be processed or to the digital key. When the digital key is loaded from the memory 30 into the input/output battery 32, scrambling bits are sent randomly on the link 31. The scrambling bits are then oriented to the scrambling register 50 according to different operational modes explained here above. The scrambling bits, like the other data elements, may be transmitted by bytes.

A random number of scrambling bytes is therefore sent between two bytes carrying information on the digital key. Should the digital key have a size of 8 bytes, a scrambling byte may be transmitted between any two bytes encoding the digital key. A scrambling byte may also be transmitted before the first byte encoding the digital key or again after the last byte encoding the digital key. Furthermore, a random number of scrambling bytes may be sent during one and the same loading of a digital key. In this example, each scrambling byte sent is always oriented towards the scrambling register 50, and each new scrambling byte sent erases the previous scrambling byte kept in the scrambling register 50.

This is also the case for the scrambling bytes coming from the processing module 42 and received by the accessory input register 54. Thus, a person who tries to obtain the digital key fraudulently by the study of the electrical signals sent by the two-way link 31 is doomed to failure. Indeed, the electrical signals corresponding to the sending of the scrambling bytes will distort the statistical studies that would have led to the discovery of the digital key.

The two-way link 52 transfers data between the scrambling register 50 and the multiplexer 34 in such a way that a study of the electrical signals between the battery of input/output registers 32 and the multiplexer 34, with a view to finding the digital key, is also doomed to failure. At output of the multiplexer 34, the control module 40 orients the data elements coming from the scrambling register 50 to the accessory input register 54 by the two-way link 56. This two-way link may be of the type formed by the buses described here above.

Just as the register 36 and the key register 38 may have a size similar to that of the register of the battery of input/output registers 32, it is enough for the accessory input register 54 to be of the minimum size needed to receive the data elements coming from the scrambling register 50. The two-way link 56 herein also ensures that any statistical study of the electrical signals exchanged between the multiplexer 34 and the input register 36 and key register 38 will be disturbed. In the same way, the study of the electrical signals between the input register 36 and the key register 38 is disturbed by the electrical signals conveyed by the two-way link 58 between the accessory input register 54 and the processing module 42.

In the preferred embodiment of the invention, the accessory input register 54 has an address close to the addresses of the input register 36 or of the key register 38. A person studying the electrical signals exchanged on the different buses thus cannot perceive any obvious difference when the addresses of the addressee registers are conveyed. When the processing module 42 produces the encrypted message that it stores in the output register 44 by the link 45, it produces scrambling bits randomly and not necessarily for each encrypted operation. These scrambling bits are stored in the accessory input register 54 by the two-way link 58. The new scrambling bits are also transmitted through the multiplexer 34 to the battery of input/output registers 50 simultaneously with the transmission of the data elements contained in the output register 44 to the input/output register 32 through the multiplexer 34.

A piece of electrical scrambling information is thus present during the loading, into the memory module 30, of the result of the encryption or decryption operation. Thus, a person who might have knowledge of the message to be encrypted cannot obtain knowledge of the encryption result by a statistical study of the electrical signals conveyed on the different links that come into action.

The securing circuit and method according to the invention can be used for any encryption and decryption operation. The circuit and the method according to the invention therefore use an electrical scrambling signal for all sensitive data transfers needed to carry out an encryption or decryption operation with a digital key.

The circuit and the method according to the invention make advantageous use of the fact that the operations performed within a battery of registers are far less accessible than the electrical information elements present between the battery of registers and various elements of the circuit.

What is claimed is:

1. An electronic circuit for the securing of a cryptography coprocessor comprising:

a memory module for storing a message to be processed by an encryption or decryption operation and an unencrypted digital key;

a battery of input/output registers connected to the memory module by a first two-way link for receiving digital key data from said memory module comprising the unencrypted digital key and a plurality of scrambling bits intermixed with the unencrypted digital key;

said battery of input/output registers comprising a scrambling register for storing the scrambling bits separate from the unencrypted digital key data;

an input register for receiving the message to be processed;

a key register for receiving the unencrypted digital key data for use in the encryption or decryption operation;

a multiplexer to carry out a transfer of data between the battery of input/output registers and the input register and the key register;

a second, dedicated two-way link connecting said multiplexer and said scrambling register for transferring the scrambling bits therebetween substantially simultaneously with the transfer of data between the battery of input/output registers and said multiplexer; and a processing module connected to said scrambling register, said input register, and said key register for determining the unencrypted digital key based upon the digital key data in said key register and the scrambling bits in said scrambling register, and for performing the encryption or decryption operation on the message stored in the input register based thereon;

a control module for controlling the memory module, the battery of input/output registers, the multiplexer and the processing module; and an output register to transmit the result of the encryption or decryption operation to the battery of input/output registers through the multiplexer.

2. An electronic circuit according to claim 1 wherein the scrambling bits are foreign to the message to be processed and to the digital key.

3. An electronic circuit according to claim 1, further comprising an accessory input register connected between said processing module and said scrambling register to receive the scrambling bits.

4. An electronic circuit according to claim 3, wherein the accessory input register is the same size as the scrambling register.

5. An electronic circuit according to claim 1, wherein the scrambling bits are generated randomly.

6. An electronic circuit according to claim 1, wherein the scrambling bits are sent in groups of eight bits.

7. An electronic circuit for a cryptography coprocessor comprising:

a plurality of input/output registers having a scrambling register for receiving digital key data comprising an unencrypted digital key and a plurality of scrambling bits intermixed with the unencrypted digital key;

an input register for receiving message data to be processed by the encryption or decryption operation;

a key register for receiving the digital key data for use in the encryption or decryption operation;

a multiplexer for transferring data between the plurality of input/output registers and the input register and the key register;

a dedicated two-way link connecting said multiplexer and said scrambling register for transferring the scrambling bits therebetween substantially simultaneously with the transfer of data between the battery of input/output registers and said multiplexer; and a processor connected to said scrambling register, said input register, and said key register for performing the encryption or decryption operation on the message data in the input register based upon the digital key data and the scrambling bits;

a controller for controlling the plurality of input/output registers, the multiplexer and the processor; and an output register to transmit the result of the encryption or decryption operation to the plurality of input/output registers through the multiplexer.

8. An electronic circuit according to claim 7 wherein the scrambling bits are foreign to the message data and the digital key.

9. An electronic circuit according to claim 7, further comprising a memory connected to the plurality of input/output registers for storing the message to be processed and the digital key.

10. An electronic circuit according to claim 7, further comprising an accessory input register connected between said processor and said scrambling register to receive the scrambling bits.

11. An electronic circuit according to claim 10, wherein the accessory input register is the same size as the scrambling register.

12. An electronic circuit according to claim 10, wherein the accessory input register is the same size as the scrambling register.

13. An electronic circuit according to claim 7, wherein the scrambling bits are generated randomly.

14. An electronic circuit according to claim 7, wherein the scrambling bits are sent in groups of eight bits.

15. A method for securing a cryptography coprocessor comprising:

transmitting data by a first two-way link from a memory module to a battery of input/output registers, the battery of input/output registers comprising a scrambling register;

transmitting data corresponding to a message to be processed by an encryption or decryption operation, through a multiplexer, from the battery of input/output registers to an input register; and transmitting digital key data for the encryption or decryption operation comprising an unencrypted digital key and a plurality of scrambling bits intermixed with the digital key, through the multiplexer, from the battery of input/output registers to a key register while substantially simultaneously transferring the scrambling bits between the multiplexer and the scrambling register via a second, dedicated two-way communication link, and storing the scrambling bits, which are foreign to the message to be processed and the unencrypted digital key, in the scrambling register of the battery of input/output registers;

using a processing module to determine the unencrypted digital key based upon the digital key data stored in the key register and the scrambling bits stored in the scrambling register; and performing the encryption or description operation on the message to be processed stored in the input register with the processing module based upon the determined digital key, and outputting the result of the encryption or decryption operation to an output register.

16. A method according to claim 15, wherein the scrambling bits are randomly intermixed with the digital key.

17. A method according to claim 15, wherein the scrambling bits are transmitted to the scrambling register whenever digital key data is input into the battery of input/output registers.

18. A method according to claim 15, wherein the scrambling bits comprise groups of eight bits.

19. A method for operating a cryptography coprocessor comprising:

transmitting data to a plurality of input/output registers, the plurality of input/output registers comprising a scrambling register;

transmitting message data to be processed by an encryption or decryption operation, through a multiplexer, from the plurality of input/output registers to an input register; and transmitting digital key data for the encryption or decryption operation comprising an unencrypted digital key and a plurality of scrambling bits intermixed with the digital key, through the multiplexer, from the plurality of input/output registers to a key register while substantially simultaneously transferring the scrambling bits between the multiplexer and the scrambling register via a dedicated two-way link, and storing the scrambling bits in the scrambling register of the plurality of input/output registers; and processing the message data with a processor receiving the data from the input register, receiving the digital key data from the key register, and the scrambling bits from the scrambling register, and outputting the corresponding message data to an output register.

20. A method according to claim 19, wherein the scrambling bits are intermixed with the digital key randomly.

21. A method according to claim 19, wherein the scrambling bits are transmitted to the scrambling register whenever digital key data is input into the plurality of input/output registers.

22. A method according to claim 19, wherein the scrambling bits comprise groups of eight bits.

* * * * *